US012667756B2

(12) United States Patent
McDermott et al.

(10) Patent No.: US 12,667,756 B2
(45) Date of Patent: Jun. 30, 2026

(54) GOLF BALL INCORPORATING INORGANIC ALUMINOSILICATE CERAMIC MICROSPHERES IN AT LEAST ONE LAYER

(71) Applicant: Acushnet Company, Fairhaven, MA (US)

(72) Inventors: Erin C. McDermott, Providence, RI (US); Manjari Kuntimaddi, Raynham, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 119 days.

(21) Appl. No.: 18/594,236

(22) Filed: Mar. 4, 2024

(65) Prior Publication Data

US 2024/0198185 A1 Jun. 20, 2024

Related U.S. Application Data

(63) Continuation-in-part of application No. 18/155,829, filed on Jan. 18, 2023, now Pat. No. 11,918,861, which is a continuation of application No. 17/355,434, filed on Jun. 23, 2021, now Pat. No. 11,673,027.

(60) Provisional application No. 63/048,870, filed on Jul. 7, 2020.

(51) Int. Cl.

| | |
|---|---|
| ***A63B 37/06*** | (2006.01) |
| ***A63B 37/00*** | (2006.01) |
| ***C08K 3/34*** | (2006.01) |
| ***C08K 5/098*** | (2006.01) |
| ***C08K 5/101*** | (2006.01) |
| ***C08K 5/14*** | (2006.01) |
| ***C08K 9/00*** | (2006.01) |

(52) U.S. Cl.

CPC ...... *A63B 37/0051* (2013.01); *A63B 37/0039* (2013.01); *A63B 37/0066* (2013.01); *A63B 37/0091* (2013.01); *A63B 37/0093* (2013.01); *C08K 3/346* (2013.01); *C08K 5/098* (2013.01); *C08K 5/101* (2013.01); *C08K 5/14* (2013.01); *C08K 9/00* (2013.01); *A63B 37/0061* (2013.01); *A63B 37/0074* (2013.01); *A63B 37/0075* (2013.01); *A63B 2209/00* (2013.01)

(58) Field of Classification Search

CPC ............................ A63B 37/005; A63B 37/007

See application file for complete search history.

(56) References Cited

U.S. PATENT DOCUMENTS

| | | | | |
|---|---|---|---|---|
| 11,198,040 | B1 * | 12/2021 | Jeon | A63B 37/0024 |
| 11,439,873 | B1 | 9/2022 | Jeon | |
| 11,673,027 | B2 * | 6/2023 | McDermott | A63B 37/0093 473/374 |
| 11,918,861 | B2 * | 3/2024 | McDermott | A63B 37/0051 |
| 2004/0044112 | A1 | 3/2004 | Sullivan et al. | |
| 2018/0257081 | A1 | 9/2018 | Thompson et al. | |
| 2019/0118042 | A1 | 4/2019 | Sullivan | |

FOREIGN PATENT DOCUMENTS

| | | | |
|---|---|---|---|
| AU | 757103 | B2 | 1/2003 |
| CA | 2283787 | A1 | 7/1999 |

OTHER PUBLICATIONS

Evaluation of Functionalized Aluminosilicate Microspheres in Elastomer Compounds; Erick Sharp, Miles Dearth; ITEC International Tire Exhibition & Conference, Tire Manufacturing, AKRON 2018; 1-30 pages.

Mechanical Properties and Morphologies of Carboxyl-Terminated Butadiene Acrylonitrile Liquid Rubber/Epoxy Blends Compatibilized by Pre-Crosslinking; Shiai Xu, Xiaoxue Song, and Yangben Cai;Apr. 22, 2020; p. 1-10.

Spherix Mineral Products; 2019; pp. 1-18; www.spherixproducts.com.

* cited by examiner

*Primary Examiner* — Raeann Gorden

(74) *Attorney, Agent, or Firm* — Steven Landolfi, Jr.

(57) ABSTRACT

A golf ball includes a plurality of layers. The layers include at least one core layer, at least one intermediate or cover layer, and at least one coating layer. At least one of these layers is formed from a composition having both a plurality of non-functionalized inorganic aluminosilicate ceramic microspheres, and a plurality of functionalized inorganic aluminosilicate ceramic microspheres dispersed throughout.

16 Claims, No Drawings

GOLF BALL INCORPORATING INORGANIC ALUMINOSILICATE CERAMIC MICROSPHERES IN AT LEAST ONE LAYER

CROSS-REFERENCE TO RELATED APPLICATIONS

The present application is a continuation-in-part of U.S. patent application Ser. No. 18/155,829, filed Jan. 18, 2023, which is a continuation of U.S. patent application Ser. No. 17/355,434, filed Jun. 23, 2021, now U.S. Pat. No. 11,673,027, which claims the benefit of U.S. Provisional Application No. 63/048,870, filed Jul. 7, 2020, the entire disclosures of which are hereby incorporated herein by reference.

FIELD OF THE INVENTION

Golf balls including at least one core layer comprised or consisting of a rubber-based composition having a relatively higher cross-link density and CoR.

BACKGROUND OF THE INVENTION

Both professional and amateur golfers use multi-piece, solid golf balls today. Basically, a two-piece solid golf ball includes a solid core protected by a cover. The core is typically made of a natural or synthetic rubber such as polybutadiene, styrene butadiene, or polyisoprene. The cover may be made of a variety of materials including ethylene acid copolymer ionomers, polyamides, polyesters, polyurethanes, and/or polyureas.

Three-piece, four-piece, and even five-piece balls have become more popular over the years. Golfers are playing with multi-piece balls for several reasons, including availability of lower-cost materials and the development of new manufacturing technologies which make it possible and cost-effective to produce a multi-layered golf ball having unique desirable resulting performance characteristics. In multi-layered golf balls, each of the core, intermediate layer and cover can be single or multi-layered, and properties such as hardness, modulus, compression, resilience, core diameter, intermediate layer thickness and cover thickness can be preselected and coordinated to target play characteristics of the resulting golf ball such as spin, initial velocity and feel.

In this regard, the core acts as an engine or spring for the golf ball. Thus, the composition and construction of the core is a key factor in determining the resiliency and rebounding performance of the ball. In general, rebounding performance is determined by calculating initial velocity of the golf ball after being struck by a golf club face and its outgoing velocity after making impact with a hard surface. Golf balls with a higher rebound velocity have a higher CoR value, retain more total energy when struck with a club, and have longer flight distance as opposed to golf balls with lower CoR values. These properties are particularly important for long distance shots.

The resiliency or CoR of the core can be increased by increasing the cross-link density of the core material. Unfortunately, conventional additives/fillers used in rubber-based formulations for this purpose heretofore tend to undesirably agglomerate within the rubber composition, and this has remained a recurring issue.

A special need therefore remains to develop golf balls incorporating cross-link density-increasing ingredients that will disperse throughout the rubber-based composition without agglomerating and meanwhile can improve important core properties such as resilience/CoR without sacrificing golf ball durability, "feel" and other important golf ball properties. Such golf balls, if producible cost effectively within already existing golf ball manufacturing systems would be particularly desirable. The golf balls of the invention and methods of making same address and fulfill these needs.

SUMMARY OF THE INVENTION

According to some embodiments of the present disclosure, a golf ball includes a plurality of layers, wherein at least one layer is formed from a composition including a plurality of non-functionalized inorganic aluminosilicate ceramic microspheres dispersed throughout. The at least one layer also includes a plurality of functionalized inorganic aluminosilicate ceramic microspheres dispersed throughout. For example, the at least one layer may be a core layer including a rubber composition.

According to some other embodiments, a golf ball includes a plurality of layers, wherein the plurality of layers include a first layer formed from a composition including a plurality of functionalized inorganic aluminosilicate ceramic microspheres dispersed throughout, and a second layer formed from a composition including a plurality of non-functionalized inorganic aluminosilicate ceramic microspheres dispersed throughout.

According to another embodiment, a golf ball includes a core and a cover, wherein the core includes a layer formed from a rubber composition comprising a plurality of inorganic aluminosilicate ceramic microspheres dispersed throughout and included in the rubber composition in an amount of at least 5 phr.

DETAILED DESCRIPTION

Accordingly, golf balls of the some embodiments include at least one core layer comprised or consisting of a rubber-based composition having a relatively higher cross-link density and CoR. The at least one core layer comprises or consists of a rubber-based composition incorporating a plurality of functionalized inorganic aluminosilicate ceramic microspheres which disperse throughout the rubber composition without agglomerating due at least in part to the physical structure and chemistry associated with the functionalized inorganic aluminosilicate ceramic microspheres, and meanwhile, can favorably increase cross-link density (and lower the normalized moisture vaper transition rate in some cases) of the resulting rubber composition without negatively impacting other important physical and chemical properties of the core and playing characteristics of the golf ball in general. Thus, in one embodiment, a golf ball of the invention comprises a core and a cover; wherein the core comprises a rubber composition including a plurality of functionalized inorganic aluminosilicate ceramic microspheres dispersed throughout.

In one embodiment, the core is a single core comprising a plurality of functionalized inorganic aluminosilicate ceramic microspheres dispersed throughout. In another embodiment, the core is a dual core wherein at least one layer of the dual core includes a rubber composition comprising the plurality of functionalized inorganic aluminosilicate ceramic microspheres dispersed throughout.

In a specific embodiment, the functionalized inorganic aluminosilicate ceramic microspheres are at least one of thiol-functionalized, vinyl-functionalized, methacrylate-functionalized, acrylate-functionalized, epoxy-functionalized, and/or carboxyl-functionalized.

Preferably, the plurality may be included in the rubber composition in an amount of from about 1 phr to about 10 phr based on 100 phr of polybutadiene contained in the rubber composition. In particular embodiments, the plurality may be included in the rubber composition in an amount of up to about 5 phr, or up to 5 phr, or from about 1 phr to about 4 phr, or from 1 phr to 4 phr, or up to about 4 phr, or up to 4 phr, or between about 1 phr and about 3 phr, or between 1 phr and 3 phr, or from about 2 phr to about 4 phr, or from 2 phr to 4 phr, or between about 1 phr and about 5 phr, or between 1 phr and 5 phr, or from about 5 phr to about 10 phr, or from 5 phr to 10 phr, or between about 5 phr and about 10 phr, or between 5 phr and 10 phr, or from about 5 phr to about 8 phr, or from 5 phr to 8 phr, or from about 6 phr to about 9 phr, or from 6 phr to 9 phr, or less than about 10 phr, or less than 10 phr, or less than about 8 phr, or less than 8 phr, or less than about 6 phr, or less than 6 phr, or less than about 4 phr, or less than 4 phr, or from about 2 phr to about 8 phr, or from 2 phr to 8 phr, or from about 2 phr to about 7 phr, or from 2 phr to 7 phr, or from about 2 phr to about 5 phr, or from 2 phr to 5 phr, or from about 7 phr to about 10 phr, or from 7 phr to 10 phr based on 100 phr of polybutadiene contained in the rubber composition.

The rubber composition may further comprise: a co-agent; zinc oxide; pentachlorothiophenol and/or salts thereof; peroxide; and optionally at least one filler.

The co-agent may be selected from zinc salts of acrylic acid and/or methacrylic acid, and is included in the rubber composition in an amount of from about 25 phr to about 45 phr based on 100 phr of polybutadiene contained in the rubber composition. In a particular such embodiment, the co-agent is at least one of zinc diacrylate and zinc dimethacrylate.

In a specific embodiment, the salt of pentachlorothiophenol is zinc pentachlorothiophenol and is included in the rubber composition in an amount of about 0.3 phr to about 0.7 phr based on 100 phr of polybutadiene contained in the rubber composition.

In a particular embodiment, the peroxide is included in the rubber composition in an amount of from about 0.5 phr to about 2.0 phr based on 100 phr of polybutadiene contained in the rubber composition.

Filler may be included in an amount that is selected based on total weight of all other ingredients such that the golf ball has a maximum weight of no greater than 45.93 g and/or 1.62 ounces as required by the United States Golf Association.

The following rubber compositions represent non-limiting examples of possible core formulations of the invention:

TABLE 1

| INGREDIENTS (PHR) | EX. 1 | EX. 2 | EX. 3 | EX. 4 | EX. 5 |
|---|---|---|---|---|---|
| Polybutadiene rubber | 100 | 100 | 100 | 100 | 100 |
| CTBN rubber | — | — | — | 5 | 10 |
| Co-agent (ZDA) | 25-35 | 25-35 | 25-35 | 30 | 30 |
| Zinc Oxide | 5.0 | 5.0 | 5.0 | 5.0 | 5.0 |
| ZnPCTP | 0.3-0.7 | 0.3-0.7 | 0.3-0.7 | 0.6 | 0.6 |
| Peroxide | 0.5-1.3 | 0.5-1.3 | 0.5-1.3 | 1.5 | 1.5 |
| Fortimix ®MC[1] | 2.5 | | | | |
| Fortimix ®HV[1] | | 3.0 | | | |
| Spherix ®10[1] | | | 3.0 | 2.5 | 2.5 |
| Filler\|Varied | Varied | Varied | Varied | Varied | Varied |

Fortimix ®MC, Fortimix ®HV and Spherix ®10 are each functionalized inorganic aluminosilicate ceramic microspheres available from Spherix, Inc.

Advantageously, a golf ball of the invention includes rubber compositions incorporating a plurality of functionalized inorganic aluminosilicate ceramic microspheres for adjusting important core properties such as CoR and/or spin by targeting cross-link density and specific gravity/density, etc. without the agglomerating problem created when using conventional additives/fillers for this purpose. Due at least in part to the "ball bearing" effect of these microspheres, the uniformity of the spherical structure, collisions between the microspheres during mixing, and the shear forces exerted on the materials in the mixture, the microspheres may be uniformly dispersed throughout the mixture—while functionalizations such as thiol, vinyl, methacrylate, epoxy, and carboxyl interact with the core formulation, thereby cross-linking to the polymer matrix permitting creation of modified rubber formulations having increased cross-link density and in some cases better hydrophobicity. That is, the inorganic aluminosilicate ceramic microspheres contain organo-functional cure sites that bond to the matrix rubber, increase rebound, reduce Tan Delta and lower compression set.

These properties also help with consistency and process control throughout core mixing and molding and repeatability of such results reduces the need for processing aids and coating fillers in order to try to address agglomeration associated with conventional fillers and microspheres which has continued to be a recurring problem in forming rubber-based core materials. An added benefit is that the functionalized inorganic aluminosilicate ceramic microspheres are created with 100% post-industrial recycled mineral, which is an unusual property within many of the materials used in golf ball production. Furthermore, these processing benefits may also be achieved and/or enhanced with the addition or substation of non-functionalized microspheres as a filler or processing aid.

In terms of functionality, the functionalized microspheres can crosslink to the polymer matrix, which in turn can alter at will important golf ball facets of the matrix using this novel approach. The functionality may be tailored to target and achieve a wide range of improved rubber-based core materials. It was unexpected that these microspheres would produce these results in golf ball materials without the need for additional de-agglomeration processing aids or coating the microspheres—and without meanwhile negatively impacting core properties and performance. Functionalizations such as thiol, vinyl, methacrylate, epoxy, and carboxyl can interact with the core formulation in different ways to produce additional cross-link density within the rubber-based core formulation matrix. The need for dispersants (i.e., anti-agglomeration and/or anti-settling agents) in connection with these microspheres is significantly reduced if not eliminated.

The term cross-link density, as used herein, is measure of crosslinked points per unit volume of polymer (normally expressed in $mol/m^3$). Cross-link density can be measured by solvent swelling measurements in accordance to ASTM-D2765-95, method C utilizing a gravimetric method. Cross-link density may also be calculated by using a laser micrometer to measure the swell ratio of the polymer immersed in a solvent and then heated, in accordance to a method developed by the Cambridge Polymer Group, Inc. located in Somerville, Massachusetts. One skilled in the art will understand that the presence and degree of crosslinking can also be determined by a variety of other methods, such as dynamic mechanical thermal analysis (DMTA) in accordance with ASTM E1640-99.

In addition, the different levels of hydrophobicity of the various types of functionalized inorganic aluminosilicate ceramic microspheres allow for further customization of these additives for improving the hydrophobicity of the rubber core, which, being cross-linked with peroxide and/or zinc diacrylate, is adversely changed by moisture. A polybutadiene core will absorb water and lose its resilience. Thus, these cores must be covered quickly to maintain optimum ball properties. And prolonged exposure to high humidity and elevated temperature may be sufficient to allow water vapor to invade the cores of some commercially available golf balls. For example, at 110° F. and 90% humidity for a sixty-day period, significant amounts of moisture enter the cores and reduce the initial velocity of the balls by 1.8 ft/s to 4.0 ft/s or greater. The change in compression may vary from 5 PGA to about 10 PGA or greater. The absorbed water vapor also reduces the coefficient of restitution (CoR) of the ball.

To date, it has been difficult for golf ball manufacturers to improve the hydrophobicity of the core material itself without meanwhile negatively impacting important properties of the core, which in turn impacts golf ball performance. Thus, moisture barrier films/layers/coatings or other outer golf ball layer materials are typically used to protect the core from moisture penetration. In a golf ball of the invention, functionalized inorganic aluminosilicate ceramic microspheres can be incorporated in at least one core layer, preferably the outermost core layer, to further customize the core layer formulation to possess an improved normalized moisture vapor transmission rate compared with the same rubber composition without any functionalized inorganic aluminosilicate ceramic microspheres.

In this regard, the core material's ability to resist moisture penetration can be defined herein in terms of a normalized MVTR (nMVTR)(g·mm/$m^2$·day)·(1/thickness (mm)) or g/($m^2$·day)) which is irrespective of material thickness and permits a comparison of the nMVTRs of two given golf ball layers notwithstanding layer thickness. This is important because the inner core and outer core often have different measurements. For example, the inner core can be relatively small in volume, for example, it may have a diameter within a range of about 0.10 to about 1.10 inches. More particularly, the inner core may have a diameter size with a lower limit of about 0.15 or 0.25 or 0.35 or 0.45 or 0.55 inches and an upper limit of about 0.60 or 0.70 or 0.80 or 0.90 inches. In one embodiment, the diameter of the inner core is in the range of about 0.025 to about 0.080 inches, more preferably about 0.030 to about 0.075 inches. Meanwhile, the outer core layer may have a thickness within a range of about 0.010 to about 0.250 inches. For example, the outer core may have a thickness with a lower limit of 0.010 or 0.020 or 0.025 or 0.030 inches and an upper limit of 0.070 or 0.080 or 0.100 or 0.200 inches. In one embodiment, the outer core layer has a thickness in the range of about 0.040 to about 0.170 inches.

In a different embodiment, a golf ball of the invention comprises a core and a cover; wherein the core comprises an inner core and an outer core layer; the inner core comprising a first rubber composition, and the outer core layer comprising a second rubber composition; wherein only one of the first rubber composition and the second rubber composition includes a plurality of functionalized inorganic aluminosilicate ceramic microspheres dispersed throughout.

In a specific such embodiment, the second rubber composition of outer core layer includes the plurality of functionalized inorganic aluminosilicate ceramic microspheres and has a crosslink density that is greater than a crosslink density of the first rubber composition of the inner core to create a positive crosslink density gradient from inner core to outer core layer. In particular such embodiments, the cross-link density of the second core layer (mol/$m^3$) may be greater than a cross-link density of the first core layer (mol/$m^3$) by up to about 10% or by up to 10%, by at least 10%, or by at least 15%, or by at least 25%, or by between about 10% and about 50%, or by up to about 50%, or by at least 50%, up to about 70% or by from about 40%-60%, or by up to about 80%, or between about 50% and 85%, or between 50% and 75%, or between about 50% and about 75%.

Alternatively, in a different embodiment, a cross-link density gradient can be created between a first core layer of a dual core and a second core layer of the dual core wherein the first core layer contains a plurality of functionalized inorganic aluminosilicate ceramic microspheres and the second core layer does not contain a plurality of functionalized inorganic aluminosilicate ceramic microspheres. In particular such embodiments, the cross-link density of the second core layer (mol/$m^3$) may be less than a cross-link density of the first core layer (mol/$m^3$) by up to about 10% or by up to 10%, by at least 10%, or by at least 15%, or by at least 25%, or by between about 10% and about 50%, or by up to about 50%, or by at least 50%, up to about 70% or by from about 40%-60%, or by up to about 80%, or between about 50% and 85%, or between 50% and 75%, or between about 50% and about 75%.

In some embodiments, there may be a nMVTR gradient between the core layers wherein the nMVTR of the second core layer is greater than an nMVTR of the first core layer, or vice vera. In such embodiments, the first core layer may be an inner core layer while the second core layer is an outer core layer, or vice versa.

In a preferred embodiment, the second rubber composition of the outer core layer has a greater nMVTR than an nMVTR of the first rubber composition of the inner core to create a positive nMVTR gradient from inner core to outer core layer.

In yet another embodiment, a golf ball of the invention comprises a core and a cover, wherein the core comprises an inner core and an outer core layer; wherein the inner core comprises a first rubber composition including a first plurality of functionalized inorganic aluminosilicate ceramic microspheres dispersed throughout; wherein the outer core layer comprises a second rubber composition including a second plurality of functionalized inorganic aluminosilicate ceramic microspheres dispersed throughout; wherein the first rubber composition and the second rubber composition differ at least in that the first plurality and the second plurality differ as to at least one of: (i) amount of functionalized inorganic aluminosilicate ceramic microspheres included in each of the first rubber composition and the second rubber composition, in parts per hundred, based on 100 phr of polybutadiene contained in the rubber composition; and/or (ii) type(s) of functionalized inorganic aluminosilicate ceramic microspheres included in each of the first rubber composition and the second rubber composition; and/or (iii) degree of functionalization of the functionalized inorganic aluminosilicate ceramic microsphere included in each of the first rubber composition and the second rubber composition.

Thus, in one specific embodiment, a golf ball of the invention comprises a dual core comprised of a spherical inner core and an outer core layer, wherein each of the spherical inner core and the outer core layer comprises the same rubber-based composition but the amount of functionalized inorganic aluminosilicate ceramic microspheres (phr per 100 phr of polybutadiene) dispersed throughout the rubber-based composition of the outer core layer is greater than the amount (phr per 100 phr of polybutadiene) of functionalized inorganic aluminosilicate ceramic microspheres dispersed throughout the rubber-based composition of the spherical inner core to create and define a positive cross-link density gradient from the spherical inner core to the outer core layer.

In a different specific embodiment, a golf ball of the invention comprises a dual core comprised of a spherical inner core and an outer core layer, wherein each of the spherical inner core and the outer core layer comprises the same rubber-based composition but the amount of functionalized inorganic aluminosilicate ceramic microspheres (phr per 100 phr of polybutadiene) dispersed throughout the rubber-based composition of the spherical inner core is greater than the amount (phr per 100 phr of polybutadiene) of functionalized inorganic aluminosilicate ceramic microspheres dispersed throughout the rubber-based composition of the outer core layer to create and define a negative cross-link density gradient from the spherical inner core to the outer core layer.

In yet another specific embodiment, a golf ball of the invention comprises a dual core comprised of a spherical inner core and an outer core layer, wherein each of the spherical inner core and the outer core layer comprises the same rubber-based composition but the type of functionalized inorganic aluminosilicate ceramic microspheres dispersed throughout the rubber-based composition of the outer core layer is different than the type of functionalized inorganic aluminosilicate ceramic microspheres dispersed throughout the rubber-based composition of the spherical inner core to define one of a positive or negative a cross-link density gradient between spherical inner core and outer core layer, depending on the pre-selected functionalized inorganic aluminosilicate ceramic microspheres dispersed throughout each core layer.

In particular such embodiments, the first plurality of functionalized inorganic aluminosilicate ceramic microspheres may be selected from thiol-functionalized, vinyl-functionalized, methacrylate-functionalized, acrylate-functionalized epoxy-functionalized, and/or carboxyl-functionalized; and the different second functionalized inorganic aluminosilicate ceramic microspheres are also selected from thiol-functionalized, vinyl-functionalized, methacrylate-functionalized, acrylate-functionalized, epoxy-functionalized, and/or carboxyl-functionalized inorganic aluminosilicate ceramic microspheres.

In still another specific embodiment, a golf ball of the invention comprises a dual core comprised of a spherical inner core and an outer core layer, wherein each of the spherical inner core and the outer core layer comprises the same rubber-based composition but the degree of functionalization of the functionalized inorganic aluminosilicate ceramic microspheres dispersed throughout the rubber-based composition of the outer core layer is different than the degree of functionalization of the functionalized inorganic aluminosilicate ceramic microspheres dispersed throughout the rubber-based composition of the spherical inner core to define one of a positive or negative a cross-link density gradient between spherical inner core and outer core layer, depending on the pre-selected functionalized inorganic aluminosilicate ceramic microspheres dispersed throughout each core layer.

In particular such embodiments, the first plurality of functionalized inorganic aluminosilicate ceramic microspheres are at least one of thiol-functionalized, vinyl-functionalized, methacrylate-functionalized, acrylate-functionalized epoxy-functionalized, and/or carboxyl-functionalized; and the second functionalized inorganic aluminosilicate ceramic microspheres are differently functionalized thiol-functionalized, vinyl-functionalized, methacrylate-functionalized, acrylate-functionalized, epoxy-functionalized, and/or carboxyl-functionalized inorganic aluminosilicate ceramic microspheres.

In each of these examples, the overall CoR of cores of the present invention at 125 ft/s is at least 0.750, or at least 0.775, or at least 0.760, or at least 0.077, or at least 0.780, or at least 0.785, or at least 0.790, or at least 0.795, or at least 0.800, or at least 0.810. A golf ball having a CoR value closer to 1 will generally correspond to a golf ball having a higher initial velocity and a greater overall distance. In general, a higher compression core will result in a higher CoR value, and therefore increasing the cross-linking density of one or more core layers will raise the compression of the core as well.

In golf balls of the invention, cross-link density gradients may be created between core layers by pre-electing the presence/absence, amount, type, and degree of functionalization of the plurality of functionalized inorganic aluminosilicate ceramic microspheres in two given core layers to target important properties such as resilience/CoR and desired playing characteristics such as distance.

The diameter and thickness of the different layers along with properties such as hardness and compression may vary depending upon the construction and desired playing performance properties of the golf ball as discussed further below. Golf balls of the invention may therefore have any number of layers, with the one limitation being that at least one layer of the golf ball, preferably a thermoset rubber core layer, includes a plurality of functionalized inorganic aluminosilicate ceramic microspheres dispersed throughout as disclosed and described herein. Thus, while a golf ball of the invention may include a dual core construction, embodiments are indeed envisioned wherein the core has three or more layers. For example, the core may comprise a spherical inner core, and intermediate core layer that surrounds and is adjacent to the spherical inner core, and an outer core layer that is disposed about the intermediate core layer. In such embodiments, it is envisioned that any one or more of these core layers may include a plurality of functionalized inorganic aluminosilicate ceramic microspheres, and that any two or more of these core layers can vary the presence/absence, amount, type, and degree of functionalization of the plurality of functionalized inorganic aluminosilicate ceramic microspheres to create cross-link density gradients therebetween to target important properties such as resilience/CoR and desired playing characteristics such as distance.

Furthermore, embodiments are indeed also envisioned wherein a layer of the golf ball other than a core layer includes a plurality of functionalized inorganic aluminosilicate ceramic microspheres throughout. For example, in some embodiments an intermediate layer or a cover layer may include a plurality of functionalized inorganic aluminosilicate ceramic microspheres throughout to target golf ball playing characteristics.

Thus, as used herein the term, "layer" means generally any spherical portion of the golf ball. It is contemplated that a resulting golf ball of the invention is at least a two-piece golf ball including at least one core layer and at least one cover layer.

Disclosed embodiments include methods, products, and compositions that include inorganic aluminosilicate ceramic microspheres in one or more layers. As described herein, microspheres can be used in a golf ball layer to improve manufacturing and processing quality. For example, the use of solid microspheres can improve processing in mixing, milling, and other golf ball manufacturing steps. Characteristics including the uniformity of the spherical structure of the microspheres, the collisions that occur during the mixing processes, and the shear forces exerted on the materials in the mixture can help to de-agglomerate the mixture and produce uniform dispersion of ingredients. An additional benefit is that inorganic aluminosilicate ceramic microspheres may be created with 100% post-industrial recycled mineral, which is an unusual property within many of the materials used in golf ball production and may help to produce a more environmentally-friendly product.

According to disclosed embodiments, microspheres can be incorporated into the composition of any golf ball layer, including a core layer, intermediate layer, cover layer, and/or coating layer to obtain these or other benefits. Some disclosed microsphere ingredients are described as functionalized microspheres, but similar microsphere ingredients may be non-functionalized and still provide some of the same disclosed benefits as a processing aid, filler, or substitute ingredient. Non-functional microspheres may be described as "non-functional" or inert due to a lack of a functionality such as the example functionalities described in relation to other embodiments (e.g., thiol, vinyl, methacrylate, epoxy, sulfide, or carboxyl functionality). Disclosed embodiments may additionally or alternatively use non-functionalized microspheres to achieve and/or enhance processing and other benefits for disclosed methods, products, and compositions.

In an exemplary embodiment, a golf ball includes at least one layer having a composition including non-functionalized microspheres as an ingredient. For example, some embodiments may include non-functionalized inorganic aluminosilicate ceramic microspheres. In one example, a golf ball includes a core layer including non-functionalized microspheres. In another example, a golf ball includes an intermediate layer including non-functionalized microspheres. In another example, a golf ball includes a cover layer including non-functionalized microspheres. In yet another example, a golf ball includes a coating layer including non-functionalized microspheres.

In core layer embodiments, non-functionalized microspheres may be used in an inner core layer, an outer core layer, or both. In some embodiments, a core layer includes both a functionalized aluminosilicate ceramic microsphere and a non-functionalized aluminosilicate microsphere.

The following rubber compositions represent non-limiting examples of possible core layer formulations:

TABLE 2

| INGREDIENTS (PHR) | EX. 1 | EX. 2 | EX. 3 | EX. 4 | EX. 5 |
|---|---|---|---|---|---|
| Polybutadiene rubber | 100 | 100 | 100 | 100 | 100 |
| Co-agent (ZDA) | 25-35 | 25-35 | 25-35 | 25-35 | 25-35 |
| Zinc Oxide | 5.0 | 5.0 | 5.0 | 5.0 | 5.0 |
| ZnPCTP | 0.3-0.7 | 0.3-0.7 | 0.3-0.7 | 0.3-0.7 | 0.3-0.7 |
| Peroxide | 0.5-1.3 | 0.5-1.3 | 0.5-1.3 | 0.5-1.3 | 0.5-1.3 |
| Non-Functionalized Microspheres[1] | 10.0 | 5.0 | 5.0 | 5.0 | 2.5 |

TABLE 2-continued

| INGREDIENTS (PHR) | EX. 1 | EX. 2 | EX. 3 | EX. 4 | EX. 5 |
|---|---|---|---|---|---|
| Functionalized Microspheres[2] | 0.0 | 0.0 | 5.0 | 2.5 | 5.0 |
| Filler | Varied | Varied | Varied | Varied | Varied |

[1]Examples of non-functionalized inorganic aluminosilicate ceramic microspheres include Spherix ® 15 and Spherix ® 20M. Spherix ® 15 has a particle size (D50) of approximately 4 μm. Spherix ® 20M has a particle size (D98) of less than 20 μm.
[2]Examples of functionalized inorganic aluminosilicate ceramic microspheres include Fortimix ®MC and Fortimix ®HV.

In some embodiments, non-functionalized inorganic aluminosilicate ceramic microspheres may be used in a core layer without accompanying use of functionalized microspheres (e.g., EX. 1 and 2 in Table 2). For example, disclosed embodiments may include a core layer having non-functionalized microspheres in the rubber composition in an amount of at least 0.5 phr. The core layer may be a single-layer core or part of a multi-layer core. The non-functionalized microspheres provide processing benefits including improved dispersion of other ingredients in addition to the use of a recycled material that may be used in place of materials such as barium sulfate, zinc oxide, or limestone. In some embodiments, non-functionalized microspheres may be used to improve core molding processes by improving workability of core ingredients, which may reduce a need for lubrication or anti-adhesion materials during processing.

In some embodiments, non-functionalized inorganic aluminosilicate ceramic microspheres may be used in a core layer in combination with functionalized microspheres (e.g., EX. 3, 4, and 5 in Table 2). The non-functionalized microspheres may be used in a varied amount, depending on whether the material is being used as a processing aid or combination filler and processing aid or other purpose. For example, disclosed embodiments may include a core layer having non-functionalized microspheres in an amount of at least 5 phr such as when being used as a filler. In still other embodiments, the non-functionalized microspheres may be present in an amount from about 1 phr to about 5 phr, such as when being used as a supplemental processing aid to functionalized microspheres.

The amount and type of functionalized microspheres may be selected based on the amount of non-functionalized microspheres also present. For example, disclosed embodiments may include approximately equal amounts of functionalized and non-functionalized microspheres, more functionalized than non-functionalized microspheres, or more non-functionalized microspheres than functionalized microspheres.

The functionalized microspheres may be used in a manner consistent with other embodiments of the present disclosure. For example, the functionalized microspheres may include vinyl-functionalized inorganic aluminosilicate ceramic microspheres for achieving a desired composition characteristic, such as a particular cross-link density or increased hydrophobicity. Further, the combination of non-functionalized microspheres and functionalized microspheres may provide enhanced processing benefits of more uniform dispersion and de-agglomeration during mixing.

In intermediate layer embodiments, microspheres may be used in a casing layer or inner cover layer, for example. In an exemplary embodiment, an intermediate layer may be made from thermoplastic or thermosetting materials including inorganic aluminosilicate ceramic microspheres for improved processing. For example, an intermediate layer may be formed of an ionomer composition comprising an ethylene acid copolymer containing acid groups that are at least partially neutralized, mixed with functional and/or non-functional inorganic aluminosilicate ceramic microspheres. Suitable ethylene acid copolymers that may be used to form the intermediate layers are generally referred to as copolymers of ethylene; $C_3$ to $C_8$ $\alpha$, $\beta$-ethylenically unsaturated mono- or dicarboxylic acid; and optional softening monomer.

Similarly, in cover layer embodiments, a thermoplastic or thermosetting material may be used in combination with inorganic aluminosilicate ceramic microspheres to improve processing of the cover material prior to and during a molding process. For example, functional and/or non-functional microspheres may be mixed with a polyurethane or ionomer cover formulation in order to promote uniform dispersion of materials and reliable cover layer molding.

Golf balls consistent with disclosed embodiments may also include one or more coating layers applied as desired via methods such as spraying, dipping, brushing, or rolling. In some embodiments, a coating layer applied to the golf ball may include functional and/or non-functional microspheres in order to provide desired properties. In one example, a paint coating layer may be mixed with inorganic aluminosilicate ceramic microspheres prior to application in order both improve the uniform dispersion of the ingredients of the coating and to produce a desired finish on the golf ball. For example, microspheres may be selected based on their effect on gloss of a paint layer. For example, non-functional microspheres may be added to a coating formulation to produce a matte finish when applied to a golf ball.

According to exemplary embodiments, at least one layer of a golf ball may include both non-functionalized microspheres and functionalized microspheres. For example, a core layer may include non-functionalized inorganic aluminosilicate ceramic microspheres in a rubber composition, together with functionalized inorganic aluminosilicate ceramic microspheres to achieve a particular property (e.g., vinyl-functionalized microspheres to adjust cross-link density). Golf balls include additional layers, such as additional core layers (in a multi-layer core), one or more intermediate layers, one or more cover layers, and one or more coating layers. In some embodiments, one or more of these other layers may be the at least one layer including both functionalized and non-functionalized microspheres.

In multi-layer core embodiments, another core layer may additionally include a plurality of inorganic aluminosilicate ceramic microspheres. For example, a first core layer may include both functionalized and non-functionalized microspheres (for achieving particular core properties in addition to uniform dispersion) and a second core layer may also include at least non-functionalized microspheres (e.g., to compatibly match the processing quality and uniform dispersion of the first core layer).

According to further embodiments, a golf ball may include a plurality of layers including a first layer that includes a plurality of functionalized inorganic aluminosilicate ceramic microspheres and a second layer that includes non-functionalized inorganic aluminosilicate ceramic microspheres. For example, several disclosed embodiments describe core layers having functionalized inorganic aluminosilicate ceramic microspheres. In some of these embodiments, multiple core layers may include functionalized inorganic aluminosilicate ceramic microspheres. The different pluralities of functionalized inorganic aluminosilicate ceramic microspheres in different layers may have different amounts and/or different levels of functionalization. These embodiments may also include the second layer that includes non-functionalized inorganic aluminosilicate ceramic microspheres. In other embodiments, the second layer may be, for example, an intermediate layer, a cover, layer, and/or a coating layer. The intermediate layer and/or cover layer may include non-functionalized inorganic aluminosilicate ceramic microspheres mixed with ionomer and/or polyurethane materials. The coating layer may be a paint layer that includes non-functionalized inorganic aluminosilicate ceramic microspheres as a means to affect the paint finish. For example, the coating layer may produce a matte finish to the golf ball due at least in part to the non-functionalized inorganic aluminosilicate ceramic microspheres. In some embodiments, at least one core layer, at least one intermediate layer or cover layer, and at least one coating layer all include non-functionalized inorganic aluminosilicate ceramic microspheres.

The disclosed combinations of layers of a golf ball, combined with disclosed variations of functional and non-functional inorganic aluminosilicate ceramic microspheres, produce golf ball embodiments with at least one layer having improved processing. In embodiments including at least two layers having inorganic aluminosilicate ceramic microspheres, the combined layers compatibly include materials that improve processing at multiple stages of manufacturing while maintaining the ability to use functional microspheres to also cause interactions to produce desired golf ball characteristics.

The present disclosure describes methods, products, and formulations that include functionalized and non-functionalized microspheres, including inorganic aluminosilicate ceramic microspheres. The microspheres may be introduced directly (e.g., as a powder) or as a masterbatch into a composition during manufacturing. The combined ingredients may be mixed to uniformly distribute the microspheres and other ingredients amongst the mixture and produce a layer-forming composition.

In one embodiment, the core may have a diameter ranging from about 0.09 inches to about 1.65 inches, or up to about 1.70 inches, or greater than 1.70 inches. In one embodiment, the diameter of the core of the present invention is about 1.2 inches to about 1.630 inches. When part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches.

In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 or 0.750 inches.

An intermediate core layer can have any known overall thickness such as within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches.

The compression of the core is generally overall in the range of about 40 to about 110, although embodiments are envisioned wherein the compression of the core is as low as 5. In other embodiments, the overall CoR of cores of the present invention at 125 ft/s is at least 0.750, or at least 0.775 or at least 0.780, or at least 0.785, or at least 0.790, or at least 0.795, or at least 0.800. While at least one core layer is preferably comprised of rubber, a core layer may also be formed of a variety of other materials that are typically also used for intermediate and cover layers.

The cores and core layers of golf balls of the invention may have varying hardnesses depending on the particular golf ball construction and playing characteristics being targeted. Core center and/or layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 and an upper limit of about 80 or 82 or 84 or 88 Shore D.

In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 and an upper limit of about 78 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 and an upper limit of about 80 or 84 or 86 or 90 Shore D. In one version, the outer surface hardness of the inner core ($H_{inner\ core\ surface}$), as measured in Shore C units, has a lower limit of about 13 or 15 or 18 or 20 and an upper limit of about 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 and an upper limit of about 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 and an upper limit of about 88 or 90 or 92 or 95 Shore C.

And, the midpoint hardness of the outer core layer ($H_{midpoint\ of\ OC}$) preferably has a hardness of about 40 Shore D or greater, and more preferably within a range having a lower limit of about 40 or 42 or 46 or 48 or 50 and an upper limit of about 80 or 82 or 85 or 88 or 90 Shore D. The midpoint hardness of the outer core layer ($H_{midpoint\ of\ OC}$), as measured in Shore C units, preferably has a lower limit of about 40 or 42 or 44 or 45 or 47 and an upper limit of about 85 or 88 or 90 or 92 or 95 Shore C.

The midpoint of a layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

The hardness of the core sub-assembly (inner core and outer core layer) is an important property. In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) In a second alternative version, the inner core may have a zero or negative hardness gradient; and the outer core layer may have a positive hardness gradient. Still yet, in another embodiment, both the inner core and outer core layers have zero or negative hardness gradients.

The core layers have positive, negative, or zero hardness gradients defined by hardness measurements made at the outer surface of the inner core (or outer surface of the outer core) and radially inward towards the center of the inner core (or inner surface or midpoint of the outer core). These measurements are made typically at 2-mm increments as described in the test methods below. In general, the hardness gradient is determined by subtracting the hardness value at the innermost portion of the component being measured (for example, the center of the inner core or inner surface or midpoint of the intermediate layer) from the hardness value at the outer surface of the component being measured (for example, the outer surface of the inner core or outer surface of the intermediate layer).

The core structure also may have a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C to provide a positive hardness gradient across the core assembly.

In another embodiment, there is a zero or negative hardness gradient across the core assembly. For example, the center of the core ($H_{inner\ core\ center}$) may have a hardness in the range of 20 to 90 Shore C; and the outer surface of the outer core may have a hardness in the range of 10 to 80 Shore C.

The hardness gradient across the core assembly will vary based on several factors including, but not limited to, the dimensions of the inner core, any intermediate core layer, and outer core layer(s).

Examples of suitable core compositions include rubber materials such as polybutadiene, ethylene-propylene rubber, ethylene-propylene-diene rubber, polyisoprene, styrene-butadiene rubber, polyalkenamers, butyl rubber, halobutyl rubber, and/or polystyrene elastomers.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures.

In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures.

A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Michigan; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pennsylvania; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be peroxide-cured without inhibiting cure. Suitable organic peroxides include, but are not limited to, dicumyl peroxide; n-butyl-4,4-di(t-butylperoxy) valerate; 1,1-di(t-butylperoxy) 3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel.

Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

Suitable co-agents, where desired, may include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates.

In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent.

Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include other "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

For example, in one embodiment, the elastomer composition may comprise i) about 50% to about 95% by weight of a non-metallocene catalyzed polybutadiene rubber; and ii) about 5 to about 50% by weight of a metallocene-catalyzed polybutadiene rubber; wherein examples of suitable non-metallocene catalysts (may be referred to as Ziegler-Natta catalysts) include neodymium, nickel, cobalt, titanium, aluminum, boron, and alkylithium-based catalysts, and combinations thereof; and examples of suitable metallocene catalysts are complexes based on metals such as cobalt, gadolinium, iron, lanthanum, neodymium, nickel, praseodymium, samarium, titanium, vanadium, zirconium; and combinations thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing.

A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In preferred embodiments, at least one core layer is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

Additionally, property gradients can be created between golf ball core layers by varying the type and/or relative amounts of peroxide used in two given layers.

Polyurethanes are also suitable materials for golf ball layers. In general, polyurethanes contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled.

Thermoplastic polyurethanes are therefore particularly desirable as an outer cover layer material. Non-limiting examples of suitable thermoplastic polyurethanes include TPUs sold under the tradenames of Texin® 250, Texin® 255, Texin® 260, Texin® 270, Texin®950U, Texin® 970U, Texin®1049, Texin®990DP7-1191, Texin® DP7-1202, Texin®990R, Texin®993, Texin® DP7-1049, Texin® 3203, Texin® 4203, Texin® 4206, Texin® 4210, Texin® 4215, and Texin® 3215, each commercially available from Covestro LLC, Pittsburgh PA; Estane® 50 DT3, Estane®58212, Estane®55DT3, Estane®58887, Estane® EZ14-23A, Estane® ETE 50DT3, each commercially available from Lubrizol Company of Cleveland, Ohio; and Elastollan® WY1149, Elastollan®1154D53, Elastollan®1180A, Elastollan®1190A, Elastollan®1195A, Elastollan®1185AW, Elastollan®1175AW, each commercially available from BASF; Desmopan® 453, commercially available from Bayer of Pittsburgh, PA, and the E-Series TPUs, such as D 60 E 4024 commercially available from Huntsman Polyurethanes of Germany.

On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[l-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 2, 2'-(1,4-phenylenedioxy)diethanol, 1,3-bis-{2-[2-(2-hydroxyethoxy) ethoxy] ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

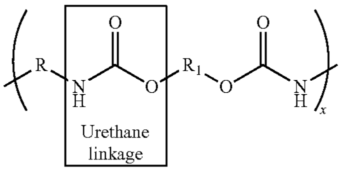

where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

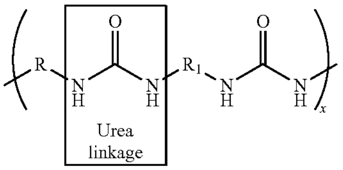

where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex©, available from SABIC Innovative Plastics; maleic anhydride-grafted polymers such as Fusabond®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Thermoplastic polyurea compositions are typically formed by reacting the isocyanate blend and polyamines at a 1:1 stoichiometric ratio. The polyurea prepolymer can be chain-extended by reacting it with a single curing agent or blend of curing agents. In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, those identified above in connection with promoting the reaction between the isocyanate and polyol compounds for producing the prepolymer or between prepolymer and chain-extender during the chain-extending step.

The hydroxyl chain-extending (curing) agents are preferably selected from the same group identified above in connection with polyurethane compositions.

Suitable amine chain-extending (curing) agents that can be used in chain-extending the polyurea prepolymer of this invention include, but are not limited to those identified above in connection with chain-extending the polyurethane prepolymer, as well as 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated).

When the polyurea prepolymer is reacted with amine-terminated curing agents during the chain-extending step, as described above, the resulting composition is essentially a pure polyurea composition.

On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea-urethane hybrid. Herein, the terms urea and polyurea are used interchangeably.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced.

When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

Additional suitable materials for golf ball layers include but are not limited to ionomers (e.g. Surlyn®, HNPs, etc.) and blends thereof. The ionomer may include, for example, partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers.

Ionomers, are typically ethylene/acrylic acid copolymers or ethylene/acrylic acid/acrylate terpolymers in which some or all of the acid groups are neutralized with metal cations such as na, li, mg, and/or zn. Non-limiting examples of commercially available ionomers suitable for use with the present invention include for example SURLYNs® from DuPont and Ioteks® from Exxon. SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN(® 8140 (Na) and SURLYN® 8546 (Li), which have an methacrylic acid content of about 19 percent. The acid groups of these high acid ionomer resins that have been neutralized to a certain degree with the designated cation.

Ionomers may encompass those polymers obtained by copolymerization of an acidic or basic monomer, such as alkyl (meth)acrylate, with at least one other comonomer, such as an olefin, styrene or vinyl acetate, followed by at least partial neutralization.

Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

For example, ionomers may be obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). In one embodiment, the ionomer is an E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium, sodium, potassium, magnesium, calcium, barium, lead, tin, zinc, or aluminum, or a combination of such cations.

Any of the acid-containing ethylene copolymers discussed above may be used to form an ionomer according to the present invention. In addition, the ionomer may be a low acid or high acid ionomer. As detailed above, a high acid ionomer may be a copolymer of an olefin, e.g., ethylene, and at least 16 weight percent of an α,β-ethylenically unsaturated carboxylic acid, e.g., acrylic or methacrylic acid, wherein about 10 percent to about 100 percent of the carboxylic acid groups are neutralized with a metal ion. In contrast, a low acid ionomer contains about 15 weight percent of the α,β-ethylenically unsaturated carboxylic acid.

Suitable commercially available ionomer resins include SURLYNs® (DuPont) and Ioteks® (Exxon). Other suitable ionomers for use in the blends of the present invention include polyolefins, polyesters, polystyrenes, SBS, SEBS, and polyurethanes, in the form of homopolymers, copolymers, or block copolymer ionomers.

The ionomers may also be blended with highly neutralized polymers (HNP). As used herein, a highly neutralized polymer has greater than about 70 percent of the acid groups neutralized. In one embodiment, about 80 percent or greater of the acid groups are neutralized. In another embodiment, about 90 percent or greater of the acid groups are neutralized. In still another embodiment, the HNP is a fully neutralized polymers, i.e., all of the acid groups (100 percent) in the polymer composition are neutralized.

Suitable HNPs include, but are not limited to, polymers containing α,β-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound.

As used herein, a partially neutralized polymer should be understood to mean polymers with about 10 to about 70 percent of the acid groups neutralized. For example, the HNP can includes about 10 percent to about 30 percent by weight of at least one oxa acid, about 70 percent to about 90 percent by weight of at least one thermoplastic resin component, and about 2 percent to about 6 percent by weight of an inorganic metal compound, organic amine, or a combination thereof.

In addition, the HNP can be formed from an acid copolymer that is neutralized by one or more amine-based or ammonium-based components, or mixtures thereof, as disclosed in co-pending U.S. patent application Ser. No. 10/875,725, filed Jun. 25, 2004, entitled "Golf Ball Compositions Neutralized with Ammonium-Based and Amine-Based Compounds," which is incorporated in its entirety by reference herein.

Furthermore, those of ordinary skill in the art will appreciate that the HNPs may be neutralized using one or more of the above methods. For example, an acid copolymer that is partially or highly neutralized in a manner described above may be subjected to additional neutralization using more traditional processes, e.g., neutralization with salts of organic fatty acids and/or a suitable cation source.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company.

The coefficient of restitution ("COR"), compression, and surface hardness of each of these materials, as measured on 1.55" injection molded spheres aged two weeks at 23° C./50% RH, are given in Table 3 below.

TABLE 3

| Example | Solid Sphere COR | Solid Sphere Compression | Solid Sphere Shore D Surface Hardness |
|---|---|---|---|
| HPF 1000 | 0.830 | 115 | 54 |
| HPF 2000 | 0.860 | 90 | 47 |
| HPF AD1035 | 0.820 | 63 | 42 |
| HPF AD 1035 Soft | 0.780 | 33 | 35 |
| HPF AD 1040 | 0.855 | 135 | 60 |
| HPF AD1172 | 0.800 | 32 | 37 |

In one embodiment, an intermediate layer is disposed between the single or multi-layered core and surrounding cover layer. These intermediate layers also can be referred to as casing or inner cover layers. The intermediate layer can be formed from any materials known in the art, including thermoplastic and thermosetting materials, but preferably is formed of an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ α,β-ethylenically unsaturated mono- or dicarboxylic acid; and optional softening monomer. These ethylene acid copolymer ionomers also can be used to form the inner core and outer core layers as described above.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form the adjacent casing, intermediate and/or inner cover layer, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

Those layers of golf balls of the invention comprising conventional thermoplastic or thermoset materials may be formed using a variety of conventional application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entireties.

A method of injection molding using a split vent pin can be found in co-pending U.S. Pat. No. 6,877,974, filed Dec. 22, 2000, entitled "Split Vent Pin for Injection Molding." Examples of retractable pin injection molding may be found in U.S. Pat. Nos. 6,129,881; 6,235,230; and 6,379,138. These molding references are incorporated in their entirety by reference herein. In addition, a chilled chamber, i.e., a cooling jacket, such as the one disclosed in U.S. Pat. No. 6,936,205, filed Nov. 22, 2000, entitled "Method of Making Golf Balls" may be used to cool the compositions of the invention when casting, which also allows for a higher loading of catalyst into the system.

Golf balls of the invention include at least one compression molded layer comprising or consisting of any extrudate that can be preformed according to methods of the invention—including, for example, extrudates comprised of rubber-based compositions. Conventionally, compression molding and injection molding are applied to thermoplastic materials, whereas RIM, liquid injection molding, and casting are employed on thermoset materials. These and other manufacture methods are disclosed in U.S. Pat. Nos. 5,484,870; 5,935,500; 6,207,784; 6,436,327; 7,648,667; 6,562,912; 6,913,726; 7,204,946; 8,980,151; 9,211,662; U.S. Publs. Nos. 2003/0067088; and 2013/0072323; the disclosures of each of which are incorporated herein by reference in their entirety.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present invention.

However, golf balls of the invention may be made by any known technique to those skilled in the art.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

The solid cores for the golf balls of this invention may be made using any suitable conventional technique such as, for example, compression or injection-molding, Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art. The cover layers are formed over the core or ball sub-assembly (the core structure and any intermediate layers disposed about the core) using any suitable method as described further below. Prior to forming the cover layers, the ball sub-assembly may be surface-treated to increase the adhesion between its outer surface and the overlying cover material using the above-described techniques.

Conventional compression and injection-molding and other methods can be used to form cover layers over the core or ball sub-assembly. In general, compression molding normally involves first making half (hemispherical) shells by injection-molding the composition in an injection mold or creating preforms from exturdate. This produces semi-cured, semi-rigid half-shells (or cups). Then, the half-shells are positioned in a compression mold around the core or ball sub-assembly. Heat and pressure are applied and the half-shells fuse together to form a cover layer over the core or sub-assembly. Compression molding also can be used to cure the cover composition after injection-molding. For example, a thermally-curable composition can be injection-molded around a core in an unheated mold. After the composition is partially hardened, the ball is removed and placed in a compression mold. Heat and pressure are applied to the ball and this causes thermal-curing of the outer cover layer.

Retractable pin injection-molding (RPIM) methods generally involve using upper and lower mold cavities that are mated together. The upper and lower mold cavities form a spherical interior cavity when they are joined together. The mold cavities used to form the outer cover layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer. Other methods can be used to make the cover including, for example, reaction injection-molding (RIM), liquid injection-molding, casting, spraying, powder-coating, vacuum-forming, flow-coating, dipping, spin-coating, and the like.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

After the golf balls have been removed from the mold, they may be subjected to finishing steps such as flash-trimming, surface-treatment, marking, and one or more coating layer may be applied as desired via methods such as spraying, dipping, brushing, or rolling. Then the golf ball can go through a series of finishing steps.

For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

Golf balls of the invention may also include at least one intermediate layer. Herein, the term “intermediate layer” includes any layer disposed between the outermost core layer and the outermost cover layer such as mantle layers, inner cover layers, moisture barrier layers, coatings, film layers, casing layers, and the like. Intermediate layers may likewise also comprise materials generally used in cores and covers as described herein for example.

In one non-limiting embodiment, an intermediate layer having a thickness of about 0.010 inches to about 0.06 inches, is disposed about a core having a diameter ranging from about 1.5 inches to about 1.59 inches.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters. However, embodiments are envisioned wherein at least one intermediate layer is formed from a different material commonly used in a core and/or cover layer.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater.

For example, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

If the ball includes an intermediate layer or inner cover layer, the hardness (material) may for example be about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches, but once again, may be changed to target playing characteristics.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

The outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Preferably, the thickness of the outer cover is about 0.020 inches or less. The outer cover preferably has a surface hardness of 75 Shore D or less, 65 Shore D or less, or 55 Shore D or less, or 50 Shore D or less, or 50 Shore D or less, or 45 Shore D or less. Preferably, the outer cover has hardness in the range of about 20 to about 70 Shore D. In one example, the outer cover has hardness in the range of about 25 to about 65 Shore D.

In one embodiment, the cover may be a single layer having a surface hardness for example of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from a composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer and an outer cover layer. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer and an outer cover layer. The inner cover layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may have a material hardness of 65 Shore D or less, or 55 Shore D or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

All this being said, embodiments are also envisioned wherein one or more of the cover layers is formed from a material typically incorporated in a core or intermediate layer.

It is envisioned that golf balls of the invention may also incorporate conventional coating layer(s) for the purposes usually incorporated. For example, one or more coating layer may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

It is envisioned that layers a golf ball of the invention other than the inventive compression molded layer may be incorporated via any of casting, compression molding, injection molding, or thermoforming as desired.

The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (CoR) of at least 0.750 and more preferably at least 0.800 (as measured per the test methods below). The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

The following test methods may be used to obtain certain properties in connection with golf balls of the invention and layers thereof.

Hardness. The center hardness of a core is obtained according to the following procedure. The core is gently pressed into a hemispherical holder having an internal diameter approximately slightly smaller than the diameter of the core, such that the core is held in place in the hemispherical of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.

Modulus, Tensile Strength and Ultimate Elongation

Modulus, tensile strength and ultimate elongation of golf ball layer materials may be targeted as known in the art. As used herein, "modulus" or "flexural modulus" refers to flexural modulus as measured using a standard flex bar according to ASTM D790-B; tensile strength refers to tensile strength as measured using ASTM D-638; and ultimate elongation refers to ultimate elongation as measured using ASTM D-638.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("CoR"). The CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($CoR=V_{out}/V_{in}=T_{in}/T_{out}$).

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments a single or dual-layer core may be replaced with a three or more layer core wherein at least one core layer has a hardness gradient.

It is understood that the golf balls of the invention incorporating a plurality of functionalized inorganic aluminosilicate ceramic microspheres dispersed throughout as disclosed herein and methods and tooling for making golf balls of the invention as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Although the golf ball of the invention has been described herein with reference to particular means and materials, it is to be understood that the invention is not limited to the particulars disclosed and extends to all equivalents within the scope of the claims.

It is understood that the manufacturing methods, compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

What is claimed is:

1. A golf ball comprising a plurality of layers, wherein at least one layer is formed from a composition comprising:

a plurality of non-functionalized inorganic aluminosilicate ceramic microspheres dispersed throughout; and a plurality of functionalized inorganic aluminosilicate ceramic microspheres dispersed throughout.

2. The golf ball of claim 1, wherein the at least one layer is a core layer comprising a rubber composition.

3. The golf ball of claim 2, wherein the core layer is a first core layer and further comprising a second core layer comprising a plurality of inorganic aluminosilicate ceramic microspheres.

4. The golf ball of claim 3, wherein the plurality of inorganic aluminosilicate ceramic microspheres in the second core layer are non-functionalized.

5. The golf ball of claim 2, wherein the plurality of non-functionalized inorganic aluminosilicate ceramic microspheres are included in the rubber composition in an amount of approximately at least 5 phr.

6. The golf ball of claim 2, wherein the plurality of non-functionalized inorganic aluminosilicate ceramic microspheres are included in the rubber composition in an amount between approximately 1 phr and approximately 5 phr.

7. The golf ball of claim 2, wherein the plurality of functionalized inorganic aluminosilicate ceramic microspheres are vinyl-functionalized inorganic aluminosilicate ceramic microspheres.

8. The golf ball of claim 2, wherein the total amount of functionalized inorganic aluminosilicate ceramic microspheres in the at least one layer is approximately the same as the total amount of non-functionalized inorganic aluminosilicate ceramic microspheres in the at least one layer.

9. The golf ball of claim 2, wherein the total amount of functionalized inorganic aluminosilicate ceramic microspheres in the at least one layer is different than the total amount of non-functionalized inorganic aluminosilicate ceramic microspheres in the at least one layer by at least 0.5 phr.

10. A golf ball comprising a plurality of layers, comprising:

a first layer formed from a composition comprising a plurality of functionalized inorganic aluminosilicate ceramic microspheres dispersed throughout; and a second layer formed from a composition comprising a plurality of non-functionalized inorganic aluminosilicate ceramic microspheres dispersed throughout.

11. The golf ball of claim 10, wherein the first layer is a core layer of the golf ball.

12. The golf ball of claim 11, wherein the first layer is a first core layer and the second layer is a second core layer.

13. The golf ball of claim 11, wherein the second layer is an intermediate layer of the golf ball comprising an ionomer.

14. The golf ball of claim 11, wherein the second layer is a cover layer of the golf ball comprising a polyurethane or ionomer material.

15. The golf ball of claim 11, wherein the second layer is a coating layer of the golf ball.

16. The golf ball of claim 15, wherein the coating layer is a paint layer producing a matte finish on a surface of the golf ball.

* * * * *